United States Patent [19]

Mundo

[11] Patent Number: 4,770,063

[45] Date of Patent: Sep. 13, 1988

[54] UNIVERSAL PROPULSION POWERPLANT AND IMPULSE DRIVE UNIT FOR SELF-PROPELLED VEHICLES

[76] Inventor: James D. Mundo, 6601 Raintree Dr., Canton, Mich. 48187

[21] Appl. No.: 904,821

[22] Filed: Sep. 8, 1986

Related U.S. Application Data

[63] Continuation of Ser. No. 629,691, Jul. 11, 1984, abandoned.

[51] Int. Cl.$^4$ .......................... F16H 27/04; F03G 3/06
[52] U.S. Cl. .......................................... 74/84 S; 74/61
[58] Field of Search .................. 74/61, 84 R, 84 S; 60/721; 180/7.1, 54.1

[56] References Cited

U.S. PATENT DOCUMENTS

| | | | |
|---|---|---|---|
| 2,831,353 | 4/1958 | Ongaro | 74/61 |
| 2,886,976 | 5/1959 | Dean | 74/61 |
| 3,365,012 | 1/1968 | Grossfield | 180/7.1 |
| 3,750,484 | 8/1973 | Benjamin | 74/84 S |
| 3,968,700 | 7/1976 | Cuff | 74/84 S |
| 4,242,918 | 1/1981 | Srogi | 74/84 S |
| 4,261,212 | 4/1981 | Melnick | 74/84 S |
| 4,577,520 | 3/1986 | Colla | 74/84 R |
| 4,579,011 | 4/1986 | Dobos | 74/61 |

FOREIGN PATENT DOCUMENTS

| | | | |
|---|---|---|---|
| 933483 | 4/1948 | France | 74/84 S |
| 573912 | 3/1958 | Italy | 74/84 S |
| 55-51972 | 4/1980 | Japan | 74/84 R |
| 81820 | 6/1956 | Netherlands | 74/61 |
| 213927 | 6/1956 | United Kingdom | 74/84 S |

OTHER PUBLICATIONS

R. F. Dempewolff, "Engine With Built-In Wings", Popular Mechanics, Sep. 1961, pp. 131-134, 264-266.

Primary Examiner—Lawrence Staab
Attorney, Agent, or Firm—Rhodes and Boller

[57] ABSTRACT

The invention relates to a universal propulsion powerplant and impulse drive unit having a uni-directional linear impulse output for accelerating, lifting, guiding and braking land, water, air and space vehicles. The propulsion powerplant, being a self-contained unit, comprises a rotary source of torque, an impulse drive unit for receiving and converting torque from the rotary torque source into a uni-directional linear impulse output, a clutch means for coupling the rotary torque source to the impulse drive unit, a means for changing the magnitude of the uni-directional linear impulse output and a means for changing the direction of the uni-directional linear impulse output. The impulse drive unit comprises pairs of conjugate contra-rotating energy cells for converting torque into the uni-directional linear impulse output of the powerplant wherein mass members move along endless paths in defined planar orbits around the rotational axes of the cells. For each mass member, during one segment of the orbit thereof, energy is absorbed from the torque source whereby the kinetic energy of the member is increased as the member moves outwardly from the center of its respective orbit with an inherent motion of a substantially unconstrained body. The uni-directional linear impulse powerplant output is produced as the mass member is constrained by a surface of the impulse drive unit to move inwardly toward the center of its orbit whereby the kinetic energy of the member is reduced and a resultant linear impulse is imparted to the surface by the mass member.

9 Claims, 10 Drawing Sheets

UNIVERSAL PROPULSION POWERPLANT AND IMPULSE DRIVE UNIT FOR SELF-PROPELLED VEHICLES

BACKGROUND OF THE INVENTION

This invention relates to the art of transportation and more particularly to a universal propulsion powerplant and impulse drive unit for propelling, lifting, guiding and braking vehicles.

Concepts exist in the prior art which convert the output torque of a power source into linear impulses for propelling, lifting, guiding and braking vehicles by the process of varying the radial distance of a rotating mass (having a constant angular velocity) from its center of rotation.

The prior art concepts are exemplified by the patents of Grossfield U.S. Pat. No. 3,365,012, Cuff U.S. Pat. No. 3,968,700, Srogi U.S. Pat. No. 4,242,918, Melnick U.S. Pat. No. 4,261,212, Trivellin No. 573,912 (Italy) and Van Der Schaar No. 81,820 (Netherland).

Although the above concept for converting torque into linear impulse exists in the prior art, there are a number of areas where it is deficient in meeting the needs of a commercially acceptable apparatus for propelling, lifting, guiding and braking a vehicle.

By way of example, the Trivellin patent discloses an apparatus where masses are constrained by a circular ring while they rotate about an axis which is eccentric with the center of the ring. The deficiency with this arrangement is that when the masses move outwardly from the center of rotation so as to increase their kinetic energies, they exert forces on the circular ring in an opposite direction to the motion of a vehicle to which the apparatus may be applied.

The Van Der Schaar patent discloses another deficiency which exists in some of the prior art. A pair of contra-non-coplanar rotating members drive masses along endless non-co-planar orbits wherein the radial distances of the masses from the axes of rotation vary to produce linear impulses which can be used for propelling, lifting, guiding or braking a vehicle. Although the shape of the orbits in Van Der Schaar is improved over Trivellin, forces exist which will oppose a vehicle to which the apparatus is applied. In addition, the non-coplanar orbits of masses produce undesirable couples which act normal to the line of action of the linear impulse output of the unit.

Another deficiency in the prior art is the absence of provisions for reducing the gyroscopic couple which is inherent because of the rotating masses during angular changes of the axis of rotation of the masses when the directions of applied vehicles are undergoing changes.

A further deficiency in some of the prior art is an absence of some means for changing the direction of the linear impulse output whereby vehicles can be alternatively propelled, lifted, guided and braked by a common apparatus.

Yet another deficiency in the prior art is the lack of a suitable configuration for a compact powerplant which embodies the foregoing concept and is adaptable to the spaces and configurations of applicable vehicles.

In view of the foregoing, it will be appreciated although a concept exists in the prior art for converting the torque of a power source into linear impulse by the process of varying the radial distances of rotating masses from their centers of rotation, numerous advances are required to provide an apparatus which is commercially acceptable.

SUMMARY OF THE INVENTION

The present invention is a universal propulsion powerplant and impulse drive unit having a uni-directional linear impulse output for propelling, lifting, guiding and braking vehicles. The propulsion powerplant, being a self-contained unit, comprises a rotary source of torque, an impulse drive unit for receiving and converting torque from the rotary torque source into a uni-directional linear impulse output, a clutch means for coupling the rotary torque source to the impulse drive unit, a means for changing the magnitude of the uni-directional linear impulse output and a means for changing the direction of the uni-directional linear impulse output. The impulse drive unit comprises pairs of conjugate contra-rotating energy cells for converting torque into the uni-directional linear impulse output of the powerplant wherein mass members move along endless paths in defined planar orbits around the rotational axes of the cells.

Each energy cell includes a rotor mounted for rotation about an axis normal to the plane of the impulse drive unit output, a pair of mass members driven by said rotor arranged for movement along an endless path in a defined planar orbit and a cam defining said planar orbit operatively engaging the pair of mass members, said mass members being substantially unconstrained by said cam during one segment of said orbit and being constrained during the remaining segment of said orbit. The travel of a mass member along one segment of said orbit comprises an energy absorbing cycle wherein the kinetic energy of the mass member increases as torque is imparted by the driving member to the mass member and the mass member moves outwardly from the center of rotation of the driving member with the inherent motion of a body which is substantially unconstrained.

The travel of the mass member along the remaining segment of said orbit comprises a power cycle wherein the kinetic energy of the mass member decreases as the mass member is constrained by the cam to move inwardly toward the center of rotation of the driving member whereby a linear impulse is imparted by the mass member to the surface of the cam constraining said member.

The magnitude of the linear impulse output varies by the square of the driving member angular velocity and the frequency varies directly with the driving member angular velocity and number of pairs of contra-rotating energy cells. The position of the line of action of said impulse output is determined by the angular orientation of the impulse drive unit about the principal axis thereof.

One object of the invention is to provide a common propulsion powerplant concept for vehicles operating in a reaction medium, such as land and water vehicles.

Another object, in addition to the foregoing objects, is to significantly improve propulsion, lift, guidance and braking of vehicles.

Another object, in addition to the foregoing objects, is to provide a means for propelling, lifting, guiding and braking vehicles which is readily adaptable to a wide variety of power sources, such as, conventional piston and turbine engines, nuclear engines, pulsed electromagnetic wave powered motors, and solar powered motors.

To foregoing objects, along with additional objects, features and benefits of the invention will become apparent from the ensuing description and accompanying drawings which disclose the invention in detail. A preferred embodiment is disclosed in accordance with the best mode contemplated in carrying out the invention and the subject matter in which exclusive rights are claimed is set forth in each of the numbered claims at the conclusion of the description.

DESCRIPTION OF THE PREFERRED EMBODIMENT

Figure 1:
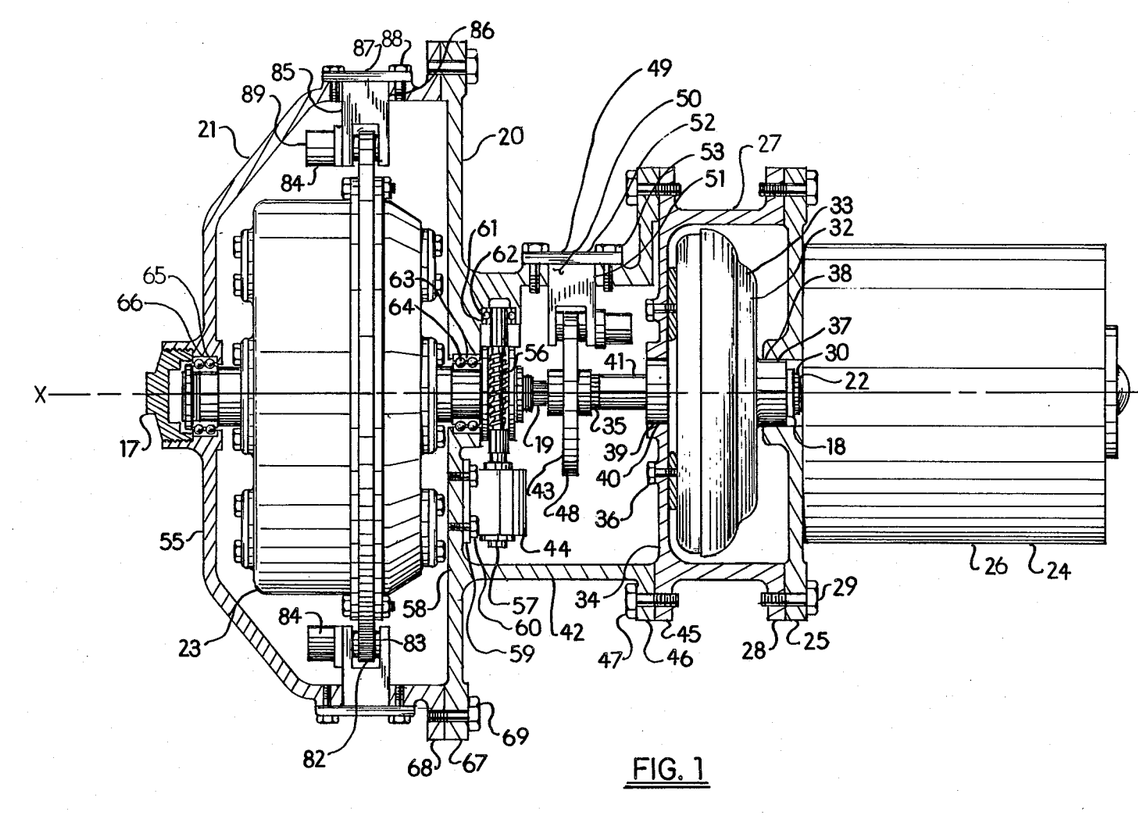
FIG. 1 is a side elevational view of a universal propulsion powertrain shown in partial section.

Referring now to the drawings wherein like reference characters refer to like and corresponding views throughout the several views, in the particular embodiment of the universal propulsion powerplant 20 and impulse drive unit 23, disclosed for illustrative purposes in FIG. 1, the powerplant 20 is a self-contained unit encased within an assembly of housings 21.

The Universal Propulsion Powerplant

The powerplant 20 is adapted for mounting in a vehicle structure whereby the uni-directional linear impulse output of the powerplant 20 is directly imparted by the mounting of said powerplant 20 to a vehicle structure for propelling, lifting, guiding or braking the vehicle, as the case may be.

The universal propulsion powerplant 20 generally comprises a rotary torque source 24, an impulse drive unit 23 for receiving and converting torque from said torque source 24 into a train of uni-directional linear impulses, a means 32 for operatively coupling the torque source 24 to the impulse drive unit 23 and means (not shown) for controlling the output of said powerplant 20.

In the orientation of FIG. 1, the torque source 24 is a horizontally disposed electric drive motor 24 at the rear of the powerplant 20 but may be of any other suitable rotary means of supplying torque, by way of example, piston and turbine engines, nuclear engines, beamed electromagnetic wave motors and solar powered motors.

A front end plate 25 is fixedly attached to the outer housing 26 of the drive motor 24. The drive motor 24 is supported in the powerplant 20 by clamping the motor front end plate 25 to the rearmost outer flange 28 of the adjacent clutch housing 27 immediately forward of the drive motor 24 with the bolt fasteners 29. The drive motor 24 has an axial output shaft 30 which is aligned with the axis U—U herein later referred to as the principal axis U—U of the impulse drive unit 23. The forward splined end 22 of the drive motor output shaft 30 engages an internal spline (not shown) in the end portion 18 of the input shaft 31 of a magnetic particle clutch 32 or some other suitable clutch means for coupling the drive motor 24 to the impulse drive unit 23.

The forward surface of the generally cylindrical clutch stator member 33 abuts the vertical wall 34 of the housing 27 which encases the clutch 32 and is fixed to said vertical wall 34 by the bolt fasteners 36. The clutch 32 is accurately positioned and supported by piloting the aft projecting shoulder 37 of the clutch stator member 33 into the aperture 38 of the drive motor front plate 25 and the forward projecting shoulder 39 of the clutch stator member 33 into the aperture 40 of the clutch housing vertical wall 34.

The forwardly projecting output shaft 41 of the clutch 32 is internally splined (not shown) and engages an external spline 19 on the aft end portion of the impulse drive unit input shaft 31. Drive motor torque is transmitted through the magnetic particle clutch 32 to the impulse drive unit 23 for conversion into a powerplant output train of uni-directional linear impulses. Immediately forward of the clutch housing 27, which encases the clutch 32, is a somewhat larger housing 42 which houses a caliper disc brake unit 43 and a worm gear drive unit 44. The larger housing 42 is fixed to the adjacent clutch housing 27 by clamping together the outer flange 45 of the clutch housing 27 and the outer flange 46 of the brake and worm drive housing 42 with the bolt fasteners 47.

The caliper disc brake unit 43 which is used, as required, for reducing the kinetic energy level of the impulse drive unit 23 has an axial rotor 48 aligned with the principal axis U—U and a flanged caliper 49 for imparting a braking force to the rotor 48. The rotor 48 is suitably fixed to the clutch output shaft 41 with splines 35 and rotates with the clutch output shaft 41. The flanged caliper 49 is installed in the powerplant 20 by inserting the caliper body 50 through the housing aperture 51 and clamping the caliper flange 52 to the housing 42 with the bolt fasteners 53.

The right angle worm gear drive unit 44 is used for changing the direction of the line of action of the uni-directional linear impulse output of the powerplant 20 and includes a worm wheel 54 aligned with the principal axis U—U and fixed to the impulse drive unit 23, a worm gear 56 for rotating the worm wheel 54, disposed at right angles to said principal axis U—U in meshing engagement with the worm wheel 54, and an electric worm gear drive motor 57 aligned with and suitably attached to the worm gear 56 for rotating the worm gear 56.

The worm gear drive motor 57 is fixed to the vertical wall 58 of the housing 42 by clamping the worm gear drive motor base 59 to said wall 58 with the bolt fasteners 60. The worm gear 56 is journaled at one end thereof by means of a conventional bearing (not shown) in the worm drive motor 57 and at the other end thereof by a bearing 61 mounted in a bore 62 of the brake and worm drive housing 42.

The principal axis U—U of the impulse drive unit 23 is common with the axis of the input shaft 31 of said impulse drive unit 23. The impulse drive unit 23 is journaled at the aft end thereof for rotation about said axis U—U by a bearing 63 mounted in a bore 64 of said brake and worm drive housing 42 and is journaled at the forward end thereof by a bearing 65 mounted in a bore 66 of the outer housing 55 which encases the impulse drive unit 23. The impulse drive unit outer housing 55 is fixed to the adjacent brake and worm drive housing 42 by clamping together the flange 67 of the brake and worm drive housing 42 and the flange 68 of the impulse drive unit housing 55 with bolt fasteners 69.

Principle of the Impulse Drive Unit

The conversion of torque from the propulsion powerplant drive motor 24 into uni-directional linear impulse is essentially a two cycle process. The initial cycle is an energy absorption cycle during which input torque of the drive motor 24 is applied to a rotating member 70 of the impulse drive unit 23 and a force is imparted by said rotating member 70 to a mass member 71 slideably mounted on the rotating member 70 and substantially unconstrained to move radially on said member 70. As a result thereof, during the initial cycle the mass member 71 moves radially outward on the driving member 70 with increasing velocity and kinetic energy. It is important to note during the energy absorption cycle that the mass member 71 is accelerated and moves at increasing velocity along the path of travel with the inherent motion of a body which is substantially radially unconstrained. At the end of the energy absorption cycle the radial distance of the mass member 71 from the rotational center of the rotating member 70 is a maximum.

The final cycle of the process for converting torque into uni-directional linear impulse is a power cycle during which the mass member 71 is constrained to move radially inward on the rotating member 70. During the power cycle, as the mass member 71 moves inwardly a linear impulse is imparted to the surface constraining the mass member 71 and is transmitted through the mounting of the powerplant 20 to a vehicle structure for the propulsion, lift, guidance or braking of the respective vehicle. At the end of the power cycle the mass member 71 is at the initial point of the energy absorption cycle and the radial distance of the mass member 71 from the rotational center of the rotating member 70 is a minimum.

Figure 9:
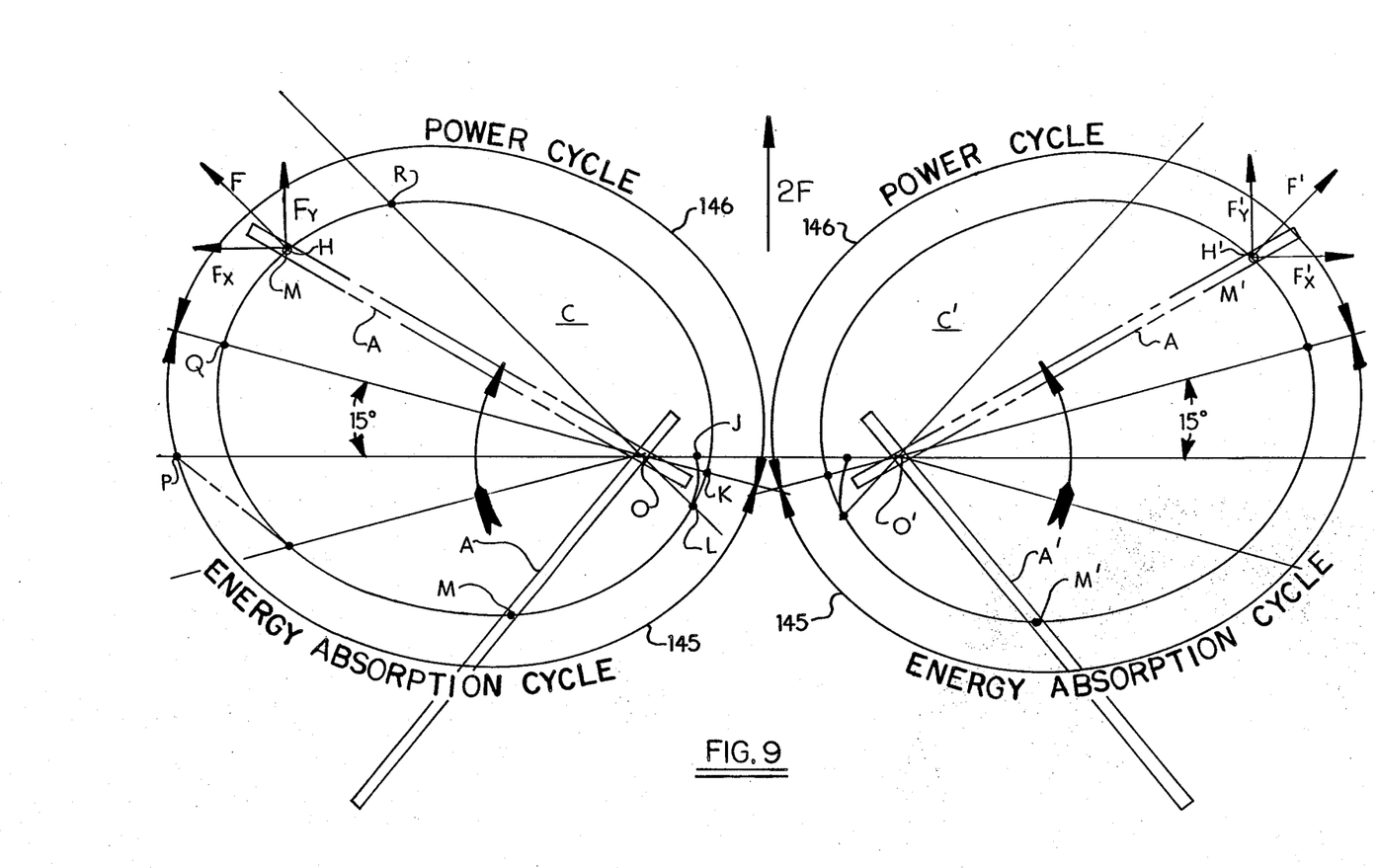
FIG. 9 is a diagrammatic view of the impulse drive unit energy cells referred to herein for disclosing the operating principles of the impulse drive unit.

Referring now to FIG. 9, a pair of contra-rotating energy cells is shown diagrammatically therein wherein one of said cells and its rotational center are designated by the characters C and O, respectively, and the other cell and its rotational center are designated by the characters C' and O', respectively. A rotating member designated by the character A is journaled and rotates clockwise about the center O of cell C and another rotating member designated by the character A' is journaled and rotates counterclockwise about the center O' of the cell C'. The centers O and O' lie on a line which is at right angles to the principal axis U—U with each of said centers O and O' being equally spaced from said principal axis U—U. The rotations of members A and A' are fully synchronized whereby the members A and A' rotate in opposite directions along symmetrically opposite paths with respect to a line passing through the centers O and O'.

Slideably engaging the rotating member A is a mass member designated by the character M and shown in the diagram as a point mass. A second mass member designated by the character M' slideably engages the contra-rotating member A' and is also shown in the diagram as a point mass.

Assume that a torque is applied by the drive motor 24 to the impulse drive unit 23 causing the member A to rotate about the center O in a clockwise direction and the member A' to rotate in a synchronized manner in a counterclockwise direction about the center O'. Neglecting friction for the present, and thereby assuming that during the energy absorption cycle the masses M and M' slide freely on their respective driving members A and A', rotating A and A' will cause mass members M and M' to slide radially outward on rotating members A and A'. With regard to mass member M (Note: the following also applies to mass member M') the differential equation of motion is the following:

$$m\ddot{r} = m\omega^2 r$$

where:
m = mass
$\omega$ = angular velocity
r = radial position
$\ddot{r}$ = second derivative of r (radial acceleration)

The solution of the differential equation for the radial position of M at any time (t) is:

$$r = r_o \cos h(\omega t)$$

where:
$\omega$ = angular velocity
t = time
$r_o$ = initial radial position
cos h = hyperbolic cosine re-writing the solution into vector calculus along the path of travel yields:

Position of mass M on path of travel:

$$\vec{r} = r_o \cos h(\omega t) \vec{e}_r$$

Velocity of mass along path of travel:

$$\dot{\vec{r}} = r_o \omega \cos h(\omega t) \vec{e}_n + r_o \omega \sin h(\omega t) \vec{e}_r$$

Acceleration of mass M along path of travel:

$$\ddot{\vec{r}} = r_o \omega^2 \cos h(\omega t) \vec{e}_r + r_o \alpha \cos h(\omega t) \vec{e}_n + 2 r_o \omega^2 \sin h(\omega t) \vec{e}_n$$

where:
$\vec{e}_r$ = unit vector in radial direction
$\vec{e}_n$ = unit vector in normal direction
$\alpha$ = angular acceleration
sin h = hyperbolic sine A study of these equations yields the following conclusions for a system where the mass M slides freely on the rotating member A without friction:

1. The path $\vec{r}$ of the mass M is constant and independent of the magnitude of the mass M as well as its angular velocity and angular acceleration.
2. The magnitude of the velocity $|\dot{\vec{r}}|$ of mass M along its path of travel varies directly with the angular velocity ω.
3. The magnitude of the acceleration $|\ddot{\vec{r}}|$ of mass M along the path of travel varies with the square of the angular velocity ω and directly with the angular acceleration α.
4. The path $\vec{r}$ of the mass M is dependent only upon its initial starting point with respect to the center of rotation O of the rotating member A.

It can be deduced from the aforementioned conclusions that as mass M travels unconstrained along the hyperbolic cosine path the force output of powerplant 20 is restricted to a torque reaction from drive motor 24 only. Hence, as the kinetic energy of mass M increases, the generation of reactions opposed to the impulse force output of the power cycle are avoided.

When friction between the mass M and rotating member A is included in the analysis, the solution of the differential equation of motion for the position of the mass M yields a family of paths of travel of the mass M which are bounded by a circle for a co-efficient of friction of infinity (i.e. no sliding on the member A) and the hyperbolic cosine for zero friction.

Thus, it is concluded from the solution of the differential equation that the most efficient unconstrained path for the mass M during the energy absorption cycle is the hyperbolic cosine. Friction at the interface of the mass M and rotating member A or any other force tending to retard the motion of the mass M on the member A will cause the mass M to deviate from the hyperbolic cosine path and thus reduce the efficiencies of the propulsion powerplant 20 and impulse drive unit 23.

Inasmuch as the hyperbolic cosine is the most efficient unconstrained path for mass M during the energy absorption cycle, it is apparent that maximum use of the hyperbolic cosine path should be used during the energy absorption cycle.

If no other forces other than the driving force of the rotating member A acted on the mass member M during the energy absorption cycle, it would not be necessary to guide the mass M along the hyperbolic cosine path. However, for practical considerations, mainly, that other forces, such as friction, accelerations from mass imbalance, and gravity will most likely exist, some guidance means, however minimum, will be preferable for the energy absorption cycle. It should be noted that as the guidance means urges mass M to follow the hyperbolic cosine path a reaction equal in magnitude and opposite in direction to the force tending to retard mass M will be imparted to the guidance means. This reaction is complimentary and additive to the impulse output generated in the power cycle.

The criteria for establishing a preferred path of travel for mass M for the power cycle are considerably different than those of the energy absorption cycle. The kinetic energy absorbed by mass M in the energy absorption cycle must be imparted as an impulse to the mass M constraining member and hence to the vehicle to which propulsion powerplant 20 is affixed.

Two factors important in the determination of the path of travel of mass M during the power cycle are the need to control the maximum stresses in the constraining member mass M acts upon to decelerate and the achievement of a continuous time rate of change of the velocity of mass M, such that, the resultant impulse output of powerplant 20 may be as smooth as possible.

Since impulse reactions are generated in the power cycle and effectively avoided in the energy absorption cycle it is apparent that an abrupt change from one cycle to the other would violate the aforementioned power cycle criteria. A transition between these two inverse cycles is therefore necessary.

Referring now to FIG. 9, in cell C a hyperbolic cosine curve is shown therein for an interval of 180° whose initial point J and final point P lie on the line of centers O and O'. After 165° of travel from point J, the mass M will be at point N. The transition from the energy absorption cycle to the power cycle begins at point N as the constraining member acts to deviate mass M from the hyperbolic cosine path of travel. As mass M moves 30° from point N to point Q the constraining member as decelerated mass M's radial velocity to zero, however, the tangential velocity and kinetic energy of mass M continues to increase from point N to a maximum at point Q.

Point Q marks the end of the energy absorption cycle, the halfway point of the transition between the two cycles and the start of the power cycle. For continuity of motion of mass M, the transition continues for an additional 30° from point Q to point R. The path of travel of mass M from point N to point R is one of a simple single degree of freedom undamped harmonic with amplitude equal to the distance from point Q to point Z. Point Z lies at the point of intersection of a line of centers from point N to point R and a line of centers from point Q to point O.

The absolute values of the radial and tangential velocities of mass M at point R are equal to the absolute values of the radial and tangential velocities at point N. Therefore, the path of travel of mass M for the power cycle from point R to point K is the inverse of the hyperbolic cosine path established in the energy absorption cycle constructed about a line of centers between points K and Q.

A transition between the end of the power cycle point K and the start of the hyperbolic cosine curve point J is required to maintain continuity of motion of mass M. A tangential curve blend between point K and a point L on the hyperbolic cosine path will re-establish mass M on the hyperbolic cosine path for the energy absorption cycle. It will be appreciated that in addition to the orbital path of the mass M which is disclosed in FIG. 9, various other paths for the mass M having slight modifications from FIG. 9 are possible within the scope of the invention.

The requirement for contra-rotating energy cells may be understood from FIG. 9 wherein the mass members M and M' are shown at points H and H', respectively, during the power cycle at one instant in time. As the mass members M and M' are decelerated by the constraining member, forces F and F' are imparted to the constraining member by the mass members M and M', respectively. By resolving the forces F and F' into components $F_x$ and $F'_x$ parallel to the line of centers O and O' and components $F_y$ and $F'_y$ perpendicular to said line of centers, it it seen that the components $F_x$ and $F'_x$, being of equal magnitude and opposite direction, cancel whereas the components $F_y$ and $F'_y$, being of equal magnitude and the same direction, add to provide a resultant $2F_y$ at the mid point of the cells and perpendicular to the line of centers O and O'. It should be noted at this point that the frequency at which this resultant $2F_y$ impulse force is output is a direct function of the angular velocity of rotating members A and A′, the number of mass members M and M′ and the number of energy cells and their phase relationships.

The Impulse Drive Unit

With reference to FIGS. 1 through 6, inclusive, the particular embodiment of the impulse drive unit 23 selected as illustrative of the invention and disclosed in detail has a pair of contra-rotating energy cells 72 and 73 whose corresponding axes 74 and 75 are disposed parallel to the principal axis U—U. The energy cells 72 and 73 are housed in an assembly consisting of a forward housing 76, an aft housing 77 and a combination gear carrier and disc brake rotor plate 78 which is clamped between the flange 79 of the housing 76 and the flange 80 of the housing 77 with bolt fasteners 81. The circular outer portion 82 of the gear carrier and brake rotor plate 78 is positioned between pads 83 of a pair of brake calipers 84. The calipers 84 are installed by inserting the caliper body portions 85 through apertures 86 in the impulse drive outer housing 55 and clamping the caliper flanges 87 to the housing 55 with bolt fasteners 88. The caliper brake unit 89 is comprised of the brake rotor portion 82 of the plate 78 and the calipers 84 which are preferably spring or otherwise biased so as to normally fix the impulse drive unit 23 to the housing 55 and unlock said impulse drive unit 23 from said housing 55 by applying power to the calipers 84 when said impulse drive unit 23 is to be rotated about the principal axis U—U.

Figure 2:
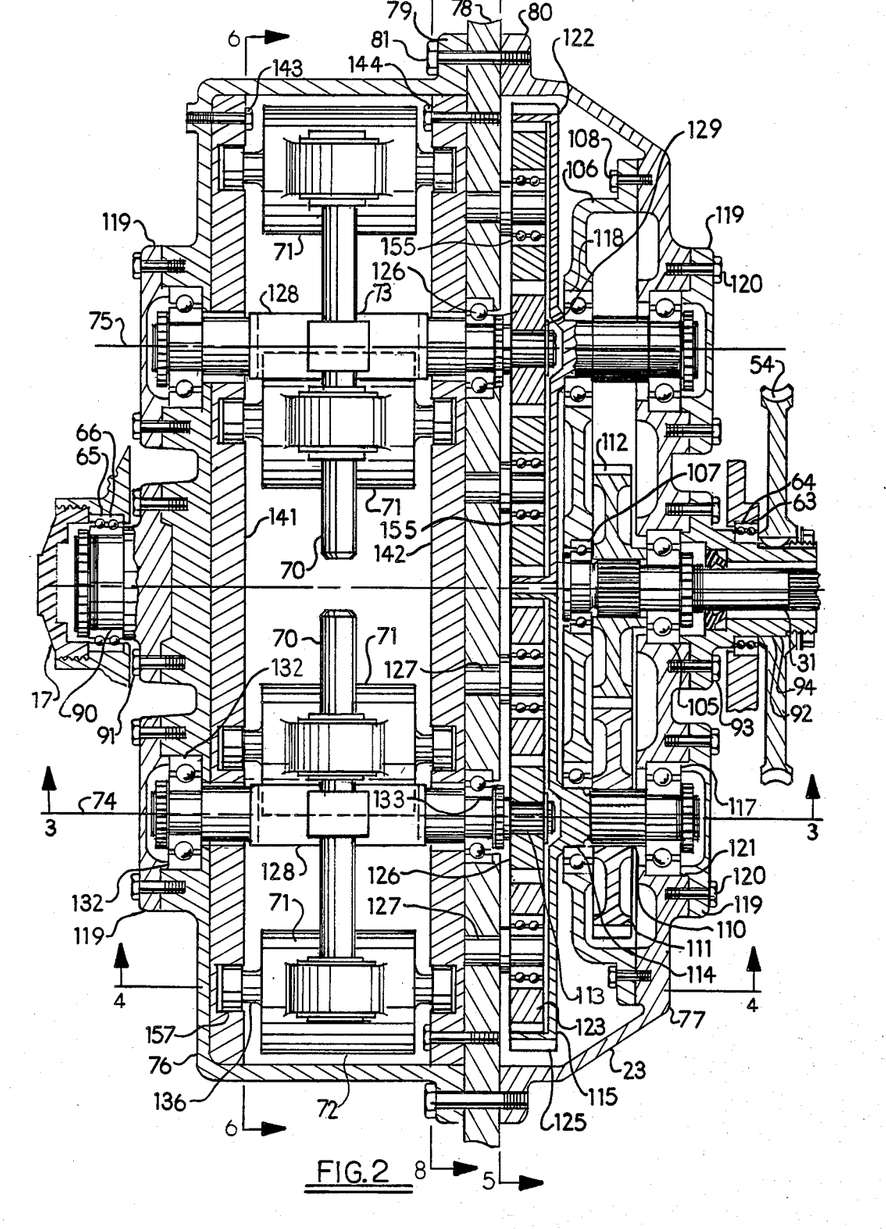
FIG. 2 is an enlarged longitudinal sectional view of the impulse drive unit of the powerplant shown in FIG. 1.

The impulse drive unit 23 is supported for rotation about the principal axis X—X at the forward end of said unit 23 by means of an axially disposed spindle 90 which is flange mounted with bolt fasteners 91 to the housing 76 and is supported at the aft end thereof by means of another axially disposed spindle 92 which is flange mounted with the bolt fasteners 93 to the housing 77. An end cap 17 threadably engages the housing 55 and retains the bearing 65 in the housing 55.

The shouldered end 94 of the impulse drive aft spindle 92 has a keyway 95 which receives a key 96, and said spindle 92 carries the worm wheel 54 and bearing 63. The key 96 engages a key slot 97 through the bore 98 of the worm wheel 54. The distal end of the impulse drive unit spindles 90 and 92 are threaded and receive conventional spanner nuts 99 and companion tab lock washers 100, the same partice applied for retaining shafts throughout the propulsion powerplant 20.

It will be recalled that during the energy absorption cycle the kinetic energy of the mass member M increased as a result of the outward movement of the member M on the rotating member A which resulted in an increase in velocity $\bar{r}$ (see FIG. 9). Since for a given radial distance the kinetic energy of a rotating body varies directly as its mass and the square of its angular velocity, for conserving weight and reducing size, it is desirable, insofar as it is possible, to operate the impulse drive unit 23 at high speeds. However, depending upon the type of torque source 24, it may be desirable to provide some means for increasing the speed of the torque source 24.

A gearing means 101, comprising a pair of parallel axis gears 111 and 112 and a pair of equivalent planetary gear sets 103 and 104 is provided in the embodiment of FIG. 2 for increasing the rotational speed of the contra-rotating energy cells 72 and 73.

The impulse drive input shaft 31 is journaled through the aft housing 77 by means of a bearing 105 and is journaled in a support housing 106 by means of another bearing 107. The support housing 106 is fixed to the interior of the aft housing 77 by bolt fasteners 108.

The impulse drive input shaft 31 extends rearward through a bore 109 in the spindle 92 and has at its aft distal end an external spline 19 which fixes said shaft 31 to the clutch output shaft 41. The driving member 112 of the parallel axis gear set is fixed to the impulse drive input shaft 31 by splines 110 and meshes with the driven gear 111 which is centered on the axis 74 of the energy cell 72. The spindle portion 114 of a ring gear member 115 of the planetary gear set 103 is fixed to the driven parallel axis gear member 111 by splines 110 and is driven by said gear 111. The ring gear spindle portion 114 is journaled in the impulse drive aft housing 77 by means of a bearing 117 and is journaled in the support housing 106 by means of another bearing 118. A cover 119 is fixed to the housing 77 with bolt fasteners 120 for sealing the access opening 121 in said housing 77, the same practice used throughout said impulse drive unit 23 for sealing other access openings.

Figure 5:
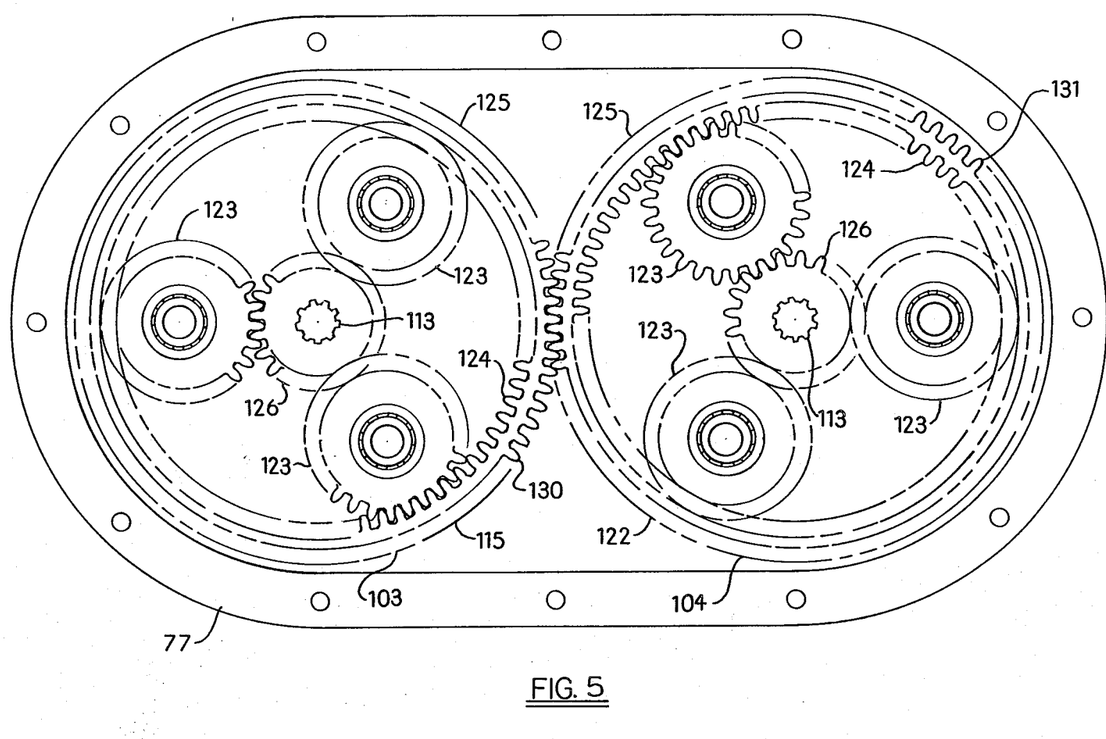
FIG. 5 is a sectional view of the impulse drive unit taken on the line 5—5 of FIG. 2 showing the planetary gear drive of said drive unit.

The particular type of planetary gear sets 103 and 104 which drive the contra-rotating energy cells 72 and 73 are commonly referred to as star units and consist of the ring gears 115 and 122, a set of three equally spaced planet gears 123 meshing with internal gear positions 124 in the annulus 125 of each ring gear 115 and 122 and rotating about fixed axes in the brake rotor and carrier plate 78, and a sun gear 126 meshing with each set of planet gears 123 and rotating about a fixed axis co-incident with the axes of the energy cells 72 and 73.

The overall gear ratio for the impulse drive unit gear train 101 is as follows:

$$R = \frac{N_1}{N_2} \times \frac{N_r}{N_s}.$$

where:
  R = gear ratio
  $N_1$ = number of teeth in driving gear member 111 of parallel axis gear set 102
  $N_2$ = number of teeth in driven gear member 112 of parallel axis gear set 102
  $N_r$ = number of teeth in ring gear 115 and 122 of planetary gear set 103 and 104
  $N_s$ = number of teeth in sun gear 126 of planetary gear set 103 and 104

Each planet gear 123 is journaled on the aft end portion of a spindle 127 which is fixed at the forward end portion thereof by press fitting or other means to the carrier plate 78. The aft portions of the spindles 127 are fixed by press fitting or other means to the inner races of bearings 155 suitably mounted in the planet gears 123.

The sun gears 126 are fixed to the end portions of the rotor shafts 134 of the energy cell rotors 70 by splines 113 and retained on said shafts 134 by retaining rings 129. The outermost portion of the ring gear 115 has the form of an external gear 130 and meshes with an outer external gear portion 131 of the ring gear 122 to provide the means for the contra-rotating motion of the energy cells 72 and 73.

Figure 3:
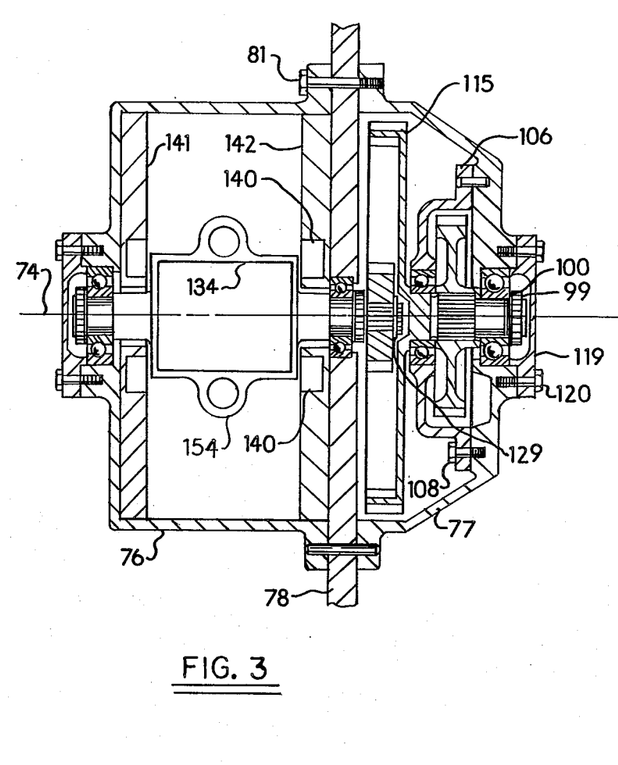
FIG. 3 is a reduced sectional view of the impulse drive unit taken on the line 3—3 of FIG. 2.
Figure 4:
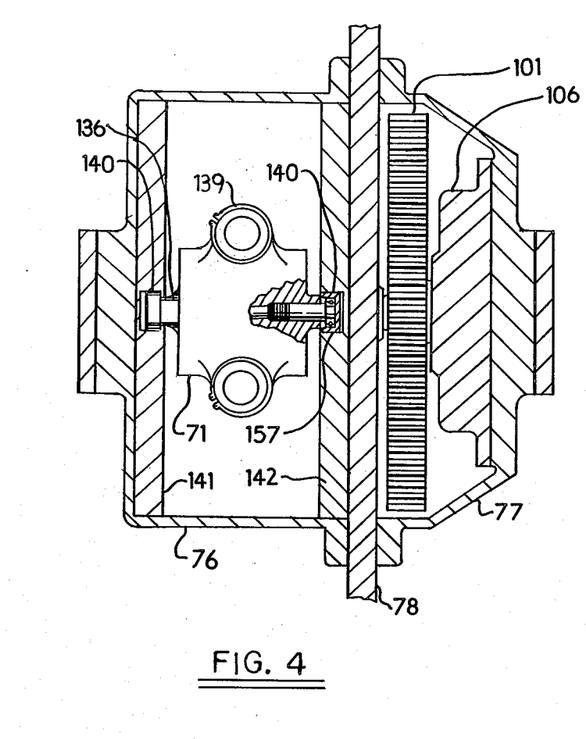
FIG. 4 is a reduced sectional view of the impulse drive unit taken on the line 4—4 of FIG. 2.

The construction of the rotors 70 of the energy cells 72 and 73 can be best seen in FIGS. 2 and 3. The rotors 70 are journaled at their forward ends by means of a bearing 132 and are journaled at their aft ends by means of a similar bearing 133. The shafts 134 of the rotors 70 are generally rectangular shaped apertured members with shouldered end portions for supporting and mounting end portions of the shafts 134 in the bearings 132 and 133. At a mid position on the outer side of each rotor shaft 134 is an apertured boss 154 formed integral with the rotor shaft 134 for receiving a cylindrical slider rod 135 which is fixed to said rotor shafts 134 by welding or other suitable means. The slider rods 135 revolve in fixed relationship with the rotor shafts 134 when the rotor shafts 134 are driven by the sun gears 126 in contra-rotating motion.

Referring now to FIG. 5, on each side of the rotor shafts 134 is the rather large mass member 71 which slideably engages the parallel pair of slider rods 135. The mass members 71 are generally cylindrical in shape with integral projecting upper and lower end boss portions 136 and side apertured boss portions 137.

Suitably mounted in each of the apertured bosses 137 is a low friction linear ball bearing 138. The bearings 138 are retained in each of the bosses 137 by retaining rings 139 which engage grooves 156 in said bearings 138. Threadably engaging each of the end boss portions 136 of the mass members 71 are low friction cam followers 157 which provide a roller means for engaging the mass members 71 with the matching symmetrically opposite cam grooves 140 of the forward cam plate 141 and the aft cam plate 142. The forward cam plate 141 is fixed to the housing 76 with bolt fasteners 143 and the aft cam plate 142 is fixed to the combination carrier and rotor plate 78 with bolt fasteners 144. The cam grooves 140 are preferably shaped to provide the path of travel for the mass members 71 shown in FIG. 9 and described in the disclosure of the principle of the impulse drive unit 23.

Figure 6:
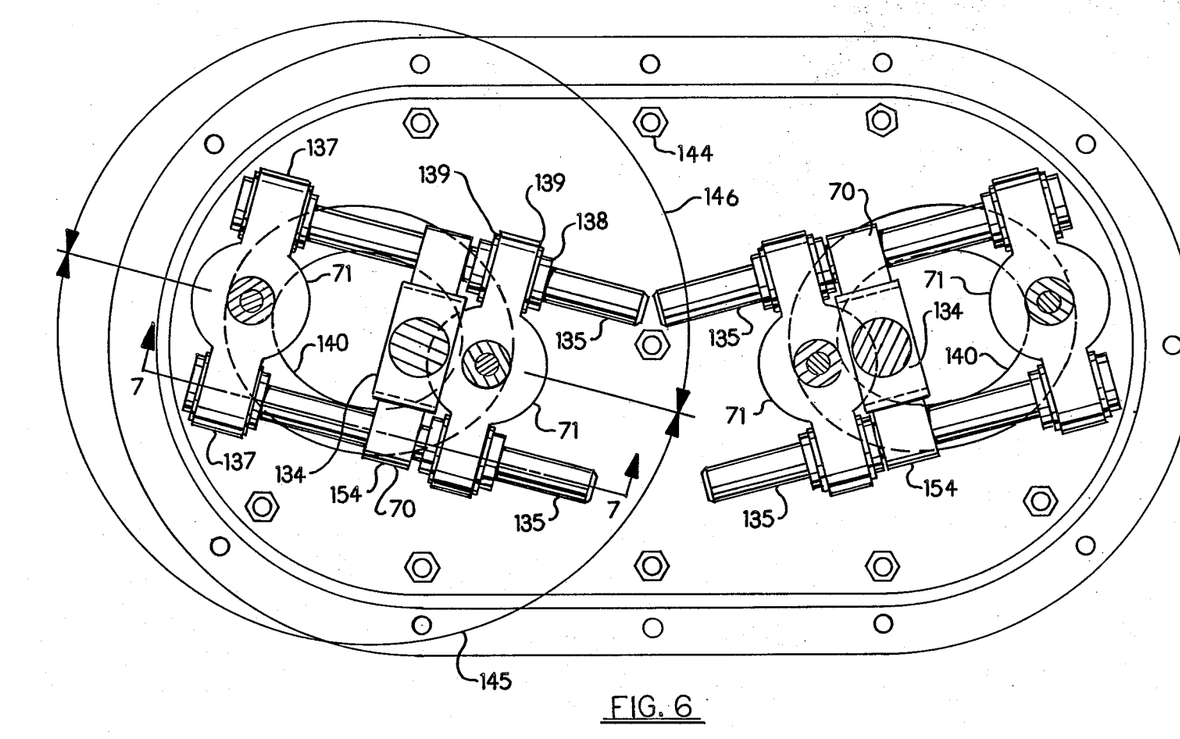
FIG. 6 is a sectional view of the impulse drive unit taken on the line 6—6 of FIG. 2 showing the pair of conjugate contra-rotating energy cells of the impulse drive unit at the initial position of the energy absorption cycle.
Figure 7:
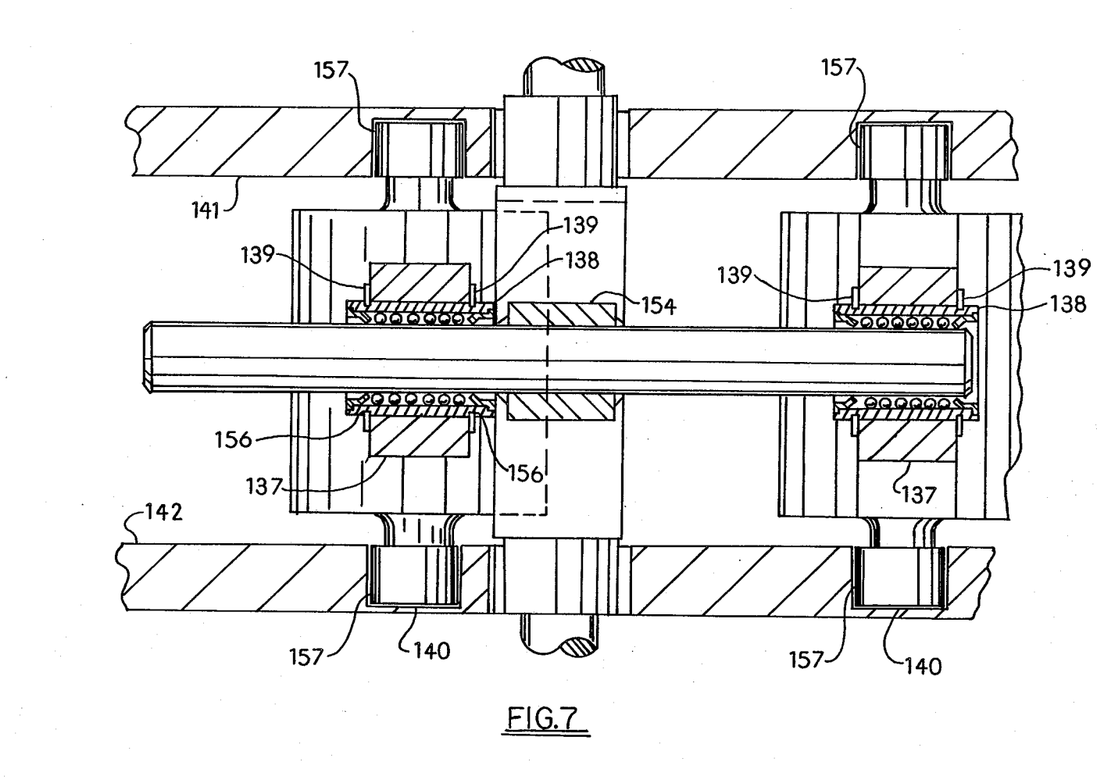
FIG. 7 is an enlarged sectional view of the impulse drive unit taken on the line 7—7 of FIG. 6.
Figure 8:
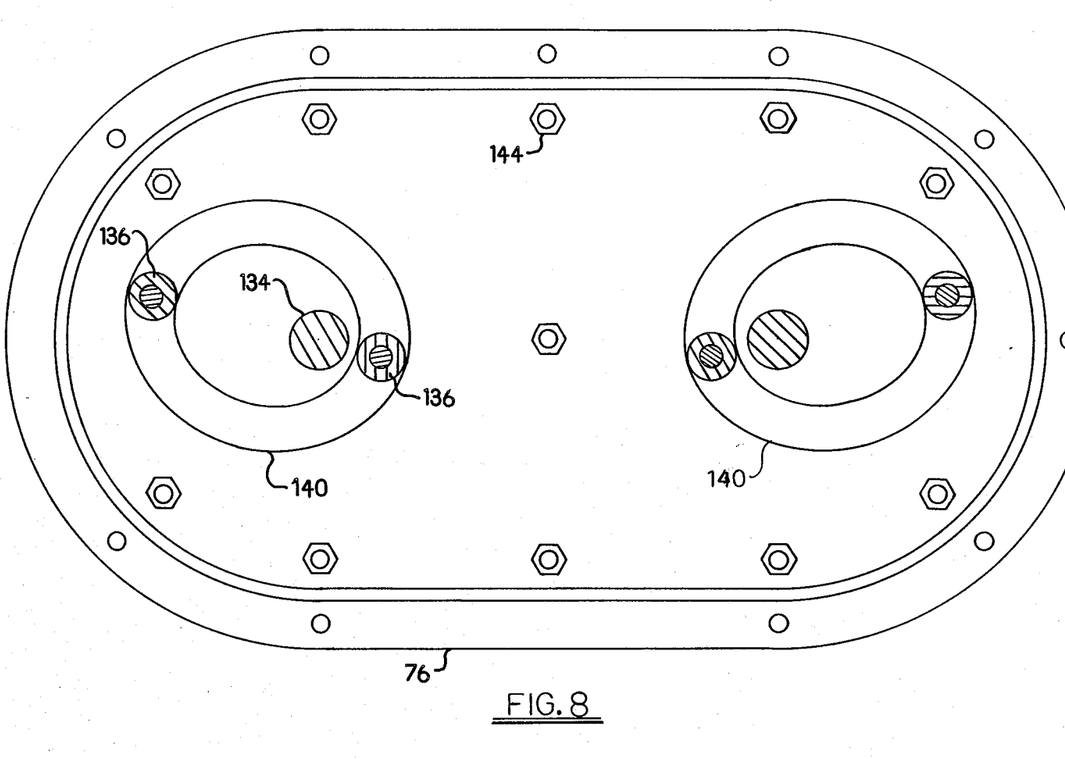
FIG. 8 is a sectional view of the impulse drive unit taken on the line 8—8 of FIG. 2 showing the cam grooves and engaging cam followers of the pair of contra-rotating energy cells.

Referring now to FIG. 6, assume that the rotor 70 of energy cell 72 rotates in a clockwise direction and that the rotor 70 of energy cell 73 rotates with synchronized contra-rotating motion in a counter-clockwise direction. It will be observed from FIG. 7 that during the segment of the mass member orbits, designated by the character 145 and corresponding to the energy absorbing cycle, when the rotors 70 rotate in opposite directions the mass members 71 are radially accelerated and slide outwardly on the slider rods 135. During the other segment of the mass member orbits, corresponding to the power cycle and designated by the character 146, the mass members 71 are urged radially inwardly by the cam grooves 140 and impart linear impulses on the reacting surfaces of the cam grooves 140. It will also be observed that during each revolution of a rotor 70 two energy absorption and two power cycles are completed. Thus, the number of power cycles per revolution of the rotor 70 can be determined by dividing the phase angle between the mass members 71 into 360° of rotor travel. From this it is clear that a smoother linear impulse output of the powerplant 20 will result by increasing the number of pairs of mass members 71 and radially phasing the positions of said pairs.

Figure 10:
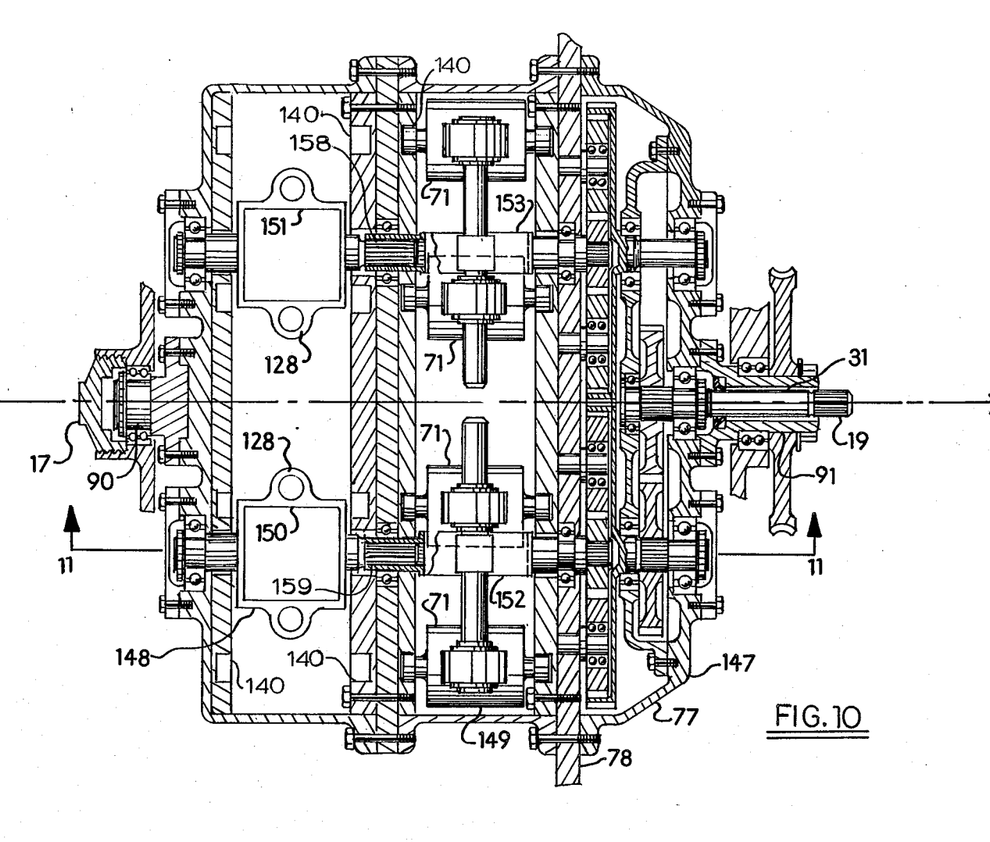
FIG. 10 is a longitudinal sectional view of an alternate embodiment comprising a compound impulse drive unit.
Figure 11:
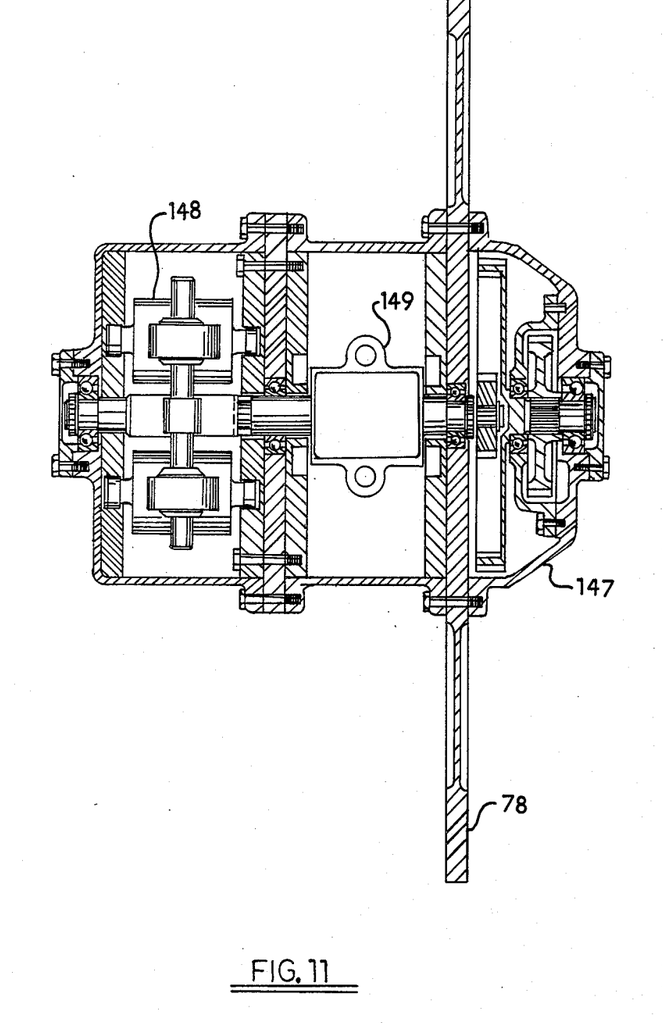
FIG. 11 is a sectional view of the compound impulse drive unit taken on the line 11—11 of FIG. 10.

The use of multiple contra-rotating pairs of energy cells for increasing powerplant output frequency is exemplified by the alternate embodiment of the tandem impulse drive unit 171 disclosed in FIGS. 10 and 11.

A forward pair of contra-rotating energy cells 148 is mechanically coupled to an aft pair of contra-rotating energy cells 149, said forward cells 148 being disposed parallel to said aft pair of cells 149. As shown in FIG. 10, the rotor shafts 150 and 151 of the forward cells 148 are fixed to the rotor shafts 152 and 153 of the aft cells 149 by spline connections 158 and 159.

The rotor shafts 150 and 151 of the forward cells 148 are radially phased at 90° to the rotor shafts 152 and 153 of the aft cells 149 and said forward rotor shafts 150 and 151 are fixed to said aft rotor shafts 152 and 153 by spline connections 158 and 159. The mass members 71 of the forward cells 148 and aft cells 149 engage the cam grooves 140 which are disposed parallel to one another and aligned in the direction of the principal axis X—X. It will be apparent that the 90° phasing of the forward cell rotor shafts 150 and 151 and aft cell rotor shafts 152 and 153 doubles frequency of the pulsed linear impulse powerplant output with the tandem embodiment 147 over the impulse drive unit 23 having a single pair of contra-rotating cells. In a manner similar to the tandem impulse drive unit 147, greater numbers of pairs of energy cells can be placed in a common propulsion powerplant for reducing component wear and stress, particularly of the cam grooves 140, and for providing a smoother linear impulse powerplant output.

APPLICATION OF THE PROPULSIVE POWERPLANT

The universal powerplant 20 is preferably mounted directly to a vehicle structure with the principal axis U—U thereof oriented perpendicular to the plane in which the uni-directional linear impulse output is to be imparted on the vehicle for propulsion, lift, guidance or braking. The control means (not shown) for varying the magnitude of powerplant output by adjusting the rotational speed of the impulse drive unit energy cells may be any existing means which is compatible with the torque source 24 or any available variable-speed drive (not shown) which can be incorporated between the torque source 24 and impulse drive unit 23. The clutch 32 provides a means for de-coupling the torque source 24 from the impulse drive unit 23 during conditions such as start-up of the torque source 24, rotations of the impulse drive unit 23 and emergency conditions.

During changes in direction of powerplant output, to prevent shock loading of the worm drive unit 44, the torque source 24 is preferably first de-coupled by the clutch 32 from the impulse drive unit 23. Thereafter, the impulse drive unit 23 is released by disengaging brake calipers 84 and angularly displaced by the worm drive unit 44 to the required direction of powerplant output.

Although but two embodiments of my invention have been disclosed and described herein, it is obvious that many changes may be made in the size, shape, arrangement and details of the various elements of the invention without departing from the spirit thereof and it is not intended to limit the scope of the invention other than by the terms of the appended claims.

I claim:

1. A universal propulsion powerplant for propelling, lifting, guiding and braking vehicles comprising, in combination:

a means for supplying torque to a rotating input shaft of an impulse drive unit;

a clutch means for operatively connecting said torque means to a rotating shaft of an impulse drive unit, said clutch means having an input member positively connected to said torque means and an output member;

a housing for enclosing said clutch means;

a disc brake rotor member axially disposed and fixed to the clutch output member;

a housing for enclosing said disc brake rotor member;

a brake caliper for supplying a braking force to the rotor mounted on said housing for enclosing said disc brake rotor;

an impulse drive unit for converting torque from said supply means into linear impulse, said impulse drive unit having a rotating input shaft positively connected to said clutch output member and at least one pair of contra-rotating energy cells operatively connected to said rotating input shaft, the axes of each of said energy cells being aligned parallel with the axis of said rotating input shaft;

a housing for enclosing said impulse drive unit;

control means for adjusting the linear impulse output of said impulse drive unit; and a means for mounting said propulsion powerplant in a vehicle whereby said linear impulse output may be imparted to the vehicle.

2. The propulsion powerplant recited in claim 1 wherein said impulse drive unit is rotatably mounted in said powerplant and means are provided for rotating said impulse drive unit for changing the direction of the linear impulse output of the powerplant.

3. The propulsion powerplant recited in claim 2 wherein said means for rotating said impulse drive unit comprise a power worm drive means mounted in said powerplant for rotating said impulse drive unit and a disc brake means mounted in said powerplant for fixing the angular position of said impulse drive unit in said powerplant.

4. The propulsion powerplant recited in claim 1 further comprising additional pairs of contra-rotating rotor members with pairs of mass members slideably mounted on said rotor members in said impulse drive unit, said additional pairs of rotor members being in phased relationship to said first pair of rotor members.

5. The propulsion powerplant recited in claim 1 wherein electric motor means are provided for supplying torque to the impulse drive unit.

6. The propulsion powerplant recited in claim 1 wherein beamed electromagnetic wave motor means are provided for supplying torque to the impulse drive unit.

7. The propulsion powerplant recited in claim 1 wherein said control means for adjusting the output of the impulse drive unit comprises a means for adjusting the rotational speed of the impulse drive input shaft to vary the amplitude of said output and means for rotating the impulse drive unit about the axis of the input shaft to vary the direction of said output.

8. The propulsion powerplant recited in claim 1 wherein each of said contra-rotating energy cells comprises:

a rotating rotor shaft, said rotor shaft being generally rectangular shaped apertured members having shouldered end portions for rotatably mounting said shaft and apertured boss side portions for receiving a slender cylindrical rod in each of the boss side portions;

a pair of parallel slender cylindrical rods, each of said rods being perpendicular to the axis of said rotor shaft and fixedly mounted at the center thereof to one of said side boss portions of the rotor shaft;

a pair of mass members, each of said mass members having apertured boss side portions for slideably mounting the mass members on opposite sides of the axis of said rotor shaft and shouldered end portions for receiving bearings;

a pair of parallel cam plates in perpendicular relationship to the axis of said rotor shaft, each of said cam plates having an endless groove for receiving one of the bearings at the apertured ends of said mass members, said cam grooves having one hyperbolic cosine portion for permitting the mass members to move outwardly with the inherent motion of unrestrained bodies during the rotation of the rotor shaft and another hyperbolic cosine portion for permitting the mass members to move inwardly to impart a linear impulse to said cam plate for propelling, lifting, guiding or braking a vehicle.

9. A universal propulsion powerplant for propelling, guiding and braking vehicles comprising in combination:

a drive motor for producing torque, said motor having a rotatably mounted output shaft for transmitting the output torque of the motor and a mounting plate for mounting the motor in said powerplant;

a first housing for mounting a clutch, said housing being fixedly attached to the mounting plate of the drive motor;

a clutch fixedly mounted in said first housing in axial alignment with the drive motor for coupling the output shaft of the drive motor to a disc brake rotor, said clutch having a rotatably mounted input shaft fixedly attached to the drive motor output shaft and a rotatably mounted output shaft for coupling the clutch to said disc brake rotor;

a second housing for mounting a disc brake rotor, said housing being fixedly attached to the first housing;

a disc brake rotor rotatably mounted in said second housing in axial alignment with the clutch, said disc brake rotor having an input shaft portion fixedly attached to the clutch output shaft and an output shaft portion for coupling the disc brake rotor to the input shaft of an impulse drive unit;

a disc brake caliper fixedly mounted in said second housing for imparting a braking force to the disc brake rotor;

a third housing for mounting an impulse drive unit, and third housing being fixedly attached to the second housing;

an impulse drive unit rotatably mounted in said third housing for converting output torque of the drive motor into a uni-directional linear impulse output, said impulse drive unit having a rear housing, a front housing fixedly attached to the rear housing, a plate fixedly mounted between said rear and front housings having an outer portion extending outwardly from said rear and front housings for receiving a braking force from a disc brake caliper, a worm wheel fixedly attached to said rear housing in axial alignment with the axis of rotation of the impulse drive unit, an input shaft fixedly attached to the output shaft portion of the disc brake rotor, a train of planetary gears operatively connected to said input shaft for providing a higher rotational speed to the rotating mass members, at least one pair of contra-rotating rotor members operatively connected to the train of planetary gears, a pair of mass members slideably mounted on each of said contra-rotating rotor members for moving along endless orbits in opposite reciprocating motions on said rotor members, and means for controlling the motions of said mass members such that on each of said rotor members the sliding mass members move in endless orbits about the center of the rotor members, said orbits having a first substantial hyperbolic cosine portion where the mass members move outwardly from the centers of rotation of the rotor members with the inherent motion of unconstrained bodies to attain higher levels of kinetic energy and a second substantial hyperbolic cosine portion where said mass members are constrained to move inwardly towards the centers of rotation of the rotor members to reduce the levels of kinetic energy of the members and impart a linear impulse to the powerplant for propelling, lifting, guiding and braking vehicles;

a worm gear rotatably mounted in said second housing and operatively engaging said worm wheel of the impulse drive unit for rotating the impulse drive unit to change the direction of the linear impulse imparted to the powerplant;

a drive motor for rotating said worm gear;

a pair of disc brake calipers fixedly mounted to said third housing for fixing the radial position of the impulse drive unit by imparting a braking force to the outer portion of the impulse drive unit plate; and a mounting means for attaching the powerplant to a vehicle structure whereby the uni-directional linear impulse output of the powerplant is imparted to said vehicle structure.

* * * * *